United States Patent [19]

Hayashi et al.

[11] Patent Number: 5,601,168
[45] Date of Patent: Feb. 11, 1997

[54] POWER TRANSMITTING DEVICE

[75] Inventors: Toshihiro Hayashi, Anjo; Akira Kishibuchi, Nagoya; Junichi Ohguchi, Toyoake; Haruhisa Shibata, Okazaki, all of Japan

[73] Assignee: Nippondenso Co., Ltd., Kariya, Japan

[21] Appl. No.: 421,870

[22] Filed: Apr. 14, 1995

[30] Foreign Application Priority Data

Apr. 15, 1994 [JP] Japan ................................ 6-076822
Mar. 30, 1995 [JP] Japan ................................ 7-072975

[51] Int. Cl.⁶ ........................ F16D 27/112; F16D 27/14
[52] U.S. Cl. .................. 192/55.6; 192/209; 192/84.96; 464/71
[58] Field of Search ............................. 192/54.4, 55.3, 192/55.6, 84 C, 200, 209; 464/71, 85, 87

[56]  References Cited

U.S. PATENT DOCUMENTS

| | | | |
|---|---|---|---|
| 1,861,390 | 5/1932 | Gunn | 464/71 X |
| 3,752,279 | 8/1973 | Briar | 192/84 C |
| 4,187,939 | 2/1980 | Silvestrini et al. | 192/84 C |
| 5,184,705 | 2/1993 | Sekiguchi et al. | |

FOREIGN PATENT DOCUMENTS

| | | | |
|---|---|---|---|
| 58-8997 | 2/1983 | Japan . | |
| 1-3332 | 1/1989 | Japan | 192/84 C |

*Primary Examiner*—Rodney H. Bonck
*Attorney, Agent, or Firm*—Cushman Darby & Cushman IP Group of Pillsbury Madison & Sutro LLP

[57]  ABSTRACT

An electromagnetic clutch which can completely meet an excessive starting torque upon starting. It is assumed that the width of each first gap in the rotating direction is the deformation and displacement of each elastic member which is smaller than the deformation and displacement of the elastic member based on a peak torque T1 just after the electromagnetic clutch is activated, and is generated based on a torque T slightly larger than a maximum torque T2 after the lapse of a predetermined time. Thus, when a torque (for example, T1) larger than the torque T is exerted on the elastic member, the outer peripheral surface of a second fitting portion abuts against the inner peripheral surface of a flange portion. As a result, the elastic member is not deformed by more than the above described deformation and displacement.

12 Claims, 7 Drawing Sheets

POWER TRANSMITTING DEVICE

CROSS REFERENCES TO THE RELATED APPLICATIONS

This application is based upon and claims priority from Japanese Patent Application No. Hei 6-76822 filed Apr. 15, 1994 and Japanese Patent Application No. Hei 7-72975 filed Mar. 30, 1995, with the contents of each document being incorporated herein by reference.

BACKGROUND OF THE INVENTION

1. Field of the Invention

The present invention relates to an improved power transmitting device in a rotating machine which is designed to absorb impact generated by a power intermittent, and more particularly to an electromagnetic clutch.

2. Description of the Prior Art

In a conventional electromagnetic clutch, for example that disclosed in Japanese Examined Utility Model Publication No. sho. 58-8997, three holes are provided on a stopper plate and cylindrical damper covers are respectively welded to positions on an outer surface of the stopper plate in which the holes are provided. Each of the damper covers is provided with a hole in the bottom portion thereof having the same diameter as a hole in the central portion thereof. In each of the damper covers, a damper rubber piece is embedded. A collar having a flange is inserted into the central portion of this damper rubber piece to fix an armature to the stopper plate through the holes of the respective damper covers and the holes formed in the stopper plate. The outside diameter of the collar is smaller than the inside diameter of each of the holes of the stopper plate and of the hole in each of the damper covers, allowing each of the collars to be displaced in the radial direction of the stopper plate and the damper covers. Consequently, an impact caused when the armature is attracted by a rotor can be absorbed. Conventionally, absorption can be accomplished in the above described manner.

The above-mentioned electromagnetic clutch according to the conventional technique, however, is defective in that when an excessive starting torque is exerted on the damper rubber pieces upon starting, the respective flanges press the damper rubber pieces in the direction in which they are attracted, and the end portions of the flanges undesirably bite into the damper rubbers while the damper rubber pieces disadvantageously pushed into the holes of the damper covers, reducing the durability of the damper rubber pieces and the durability of the electromagnetic clutch.

In addition, in the above-described electromagnetic clutch according to the prior art, about a further problem occurs in that when an excessive starting torque is applied to the damper rubber pieces upon starting, force in the rotating direction (torsional direction) of the electromagnetic clutch is inconveniently applied to the damper rubber pieces. As a result, the damper rubber pieces are seriously deformed, so that the durability of the damper rubber pieces is reduced and the durability of the overall electromagnetic clutch is severely reduced.

SUMMARY OF THE INVENTION

It is an object of the present invention to provide an electromagnetic clutch to satisfactorily and completely accept an excessively large starting torque upon starting.

In accordance with the present invention, the object can be attained by the following improvements applied to a power transmitting device, or specifically, a electromagnetic clutch.

In accordance with one of preferred mode of the invention, there is employed as technical means a power transmitting device for intermitting the power of a rotating machine, comprising a first rotating member 4 which receives power from a driving force source and rotates; a first rotated member 6 having an engaging surface 26 facing one end face 15 of the first rotating member and selectively engaging therewith or disengaging therefrom; a second rotated member 7 fixed to the non-engaging surface side of the first rotated member and connected to the driving shaft of the rotating machine; a cylindrically recessed elastic member housing portion 19 provided in the second rotated member and having an insertion hole 24 in the bottom portion thereof; an elastic member 9 provided in the elastic member housing portion and connecting to the inner peripheral wall thereof; a fixing member 8 tightly inserted in the direction of the driving shaft in the elastic member and passing through the insertion hole to fix the first rotated member and the second rotated member together, the fixing member having a first gap 36 in the rotating direction of the driving shaft of the rotating machine, formed between the outer peripheral wall of the fixing member and the peripheral wall of the insertion hole, wherein the first gap is made smaller than a first deformation displacement ($\gamma$) of the elastic member which is generated based on a first maximum torque T1 exerted on the elastic member immediately after the one end face of the first rotating member has been engaged with the engaging surface of the first rotated member, and is larger than a second deformation displacement ($\beta$) which is generated based on a second maximum torque T2 upon steady operation after the elapse of a predetermined time after the one end face of the first rotating member engages with the engaging surface of the first rotated member.

In other preferred mode of the invention, there is employed a flange portion 21 for pressing the elastic member to the first rotated member side is provided at one end of the fixing member and a second gap 76 is provided between the end portion 77 of this flange portion and the elastic member facing this end portion.

When the power transmitting device according to the present invention having the above-mentioned structure is employed, as soon as the one end face of the first rotating member engages with the engaging surface of the first rotated member, a torque imposed on the elastic member reaches a first maximum torque, so that the deformation and displacement of the elastic member becomes a first type of deformation and displacement. However, in case in which a first gap smaller in dimension than the first deformation and displacement is obtained before the torque reaches the first maximum torque and the deformation and displacement of the elastic member becomes a first type of deformation and displacement, the outer peripheral surface of the fixing member connects to the peripheral wall of the inserting hole. As a result, the advantage that, even if a torque larger than the torque by which the first deformation and displacement of the elastic member is produced and that deformation whose dimensions are equal to the first gap is applied to the elastic member, the elastic member is not deformed more than the first gap can be attained. Therefore, excessive deformation of the elastic member can be suitably controlled and the durability of the elastic member can be improved, which contributes to the improved durability of the power transmitting device.

Meanwhile, in a case where a torque smaller than the torque by which the first gap is formed is applied to the elastic member, the elasticity of the elastic member can be effectively utilized. Therefore, an impact propagated from the first rotating member to the first rotated member and the second rotated member can be mitigated. The durability of the elastic member and the durability of the power transmitting device can be conveniently improved.

BRIEF DESCRIPTION OF THE DRAWINGS

Other features and advantages of the present invention will be apparent from the following description taken in connection with the accompanying drawings, in which.

DETAILED DESCRIPTION OF THE PREFERRED EMBODIMENT

The structure and functional effect of the power transmitting device of the present invention will now be described by referring to an embodiment illustrated in the accompanying drawings.

The present embodiment is applied to an electromagnetic clutch which is employed in an air conditioner for a vehicle as a power transmitting device.

Figure 2:
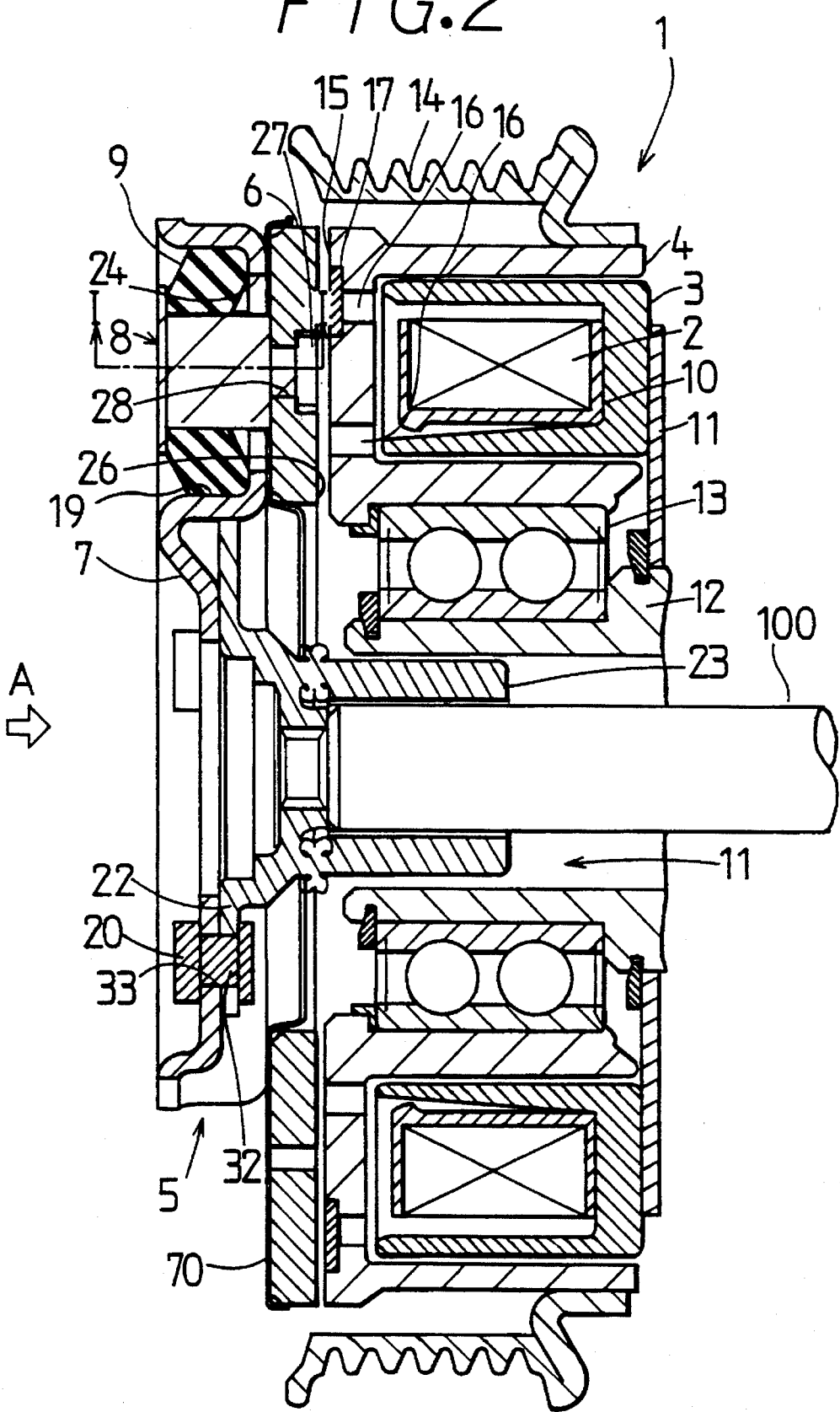
FIG. 2 is a sectional view of an entire electromagnetic clutch of the above-described first embodiment.
Figure 3:
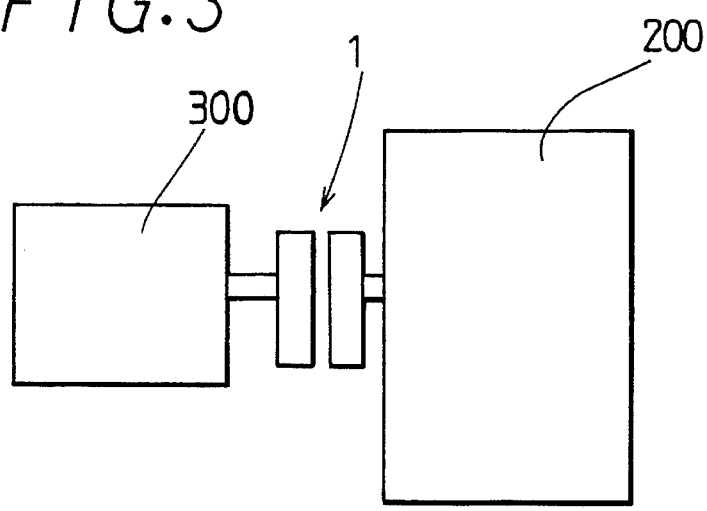
FIG. 3 is a schematic view of the electromagnetic clutch of the first embodiment mounted on a vehicle.
Figure 4:
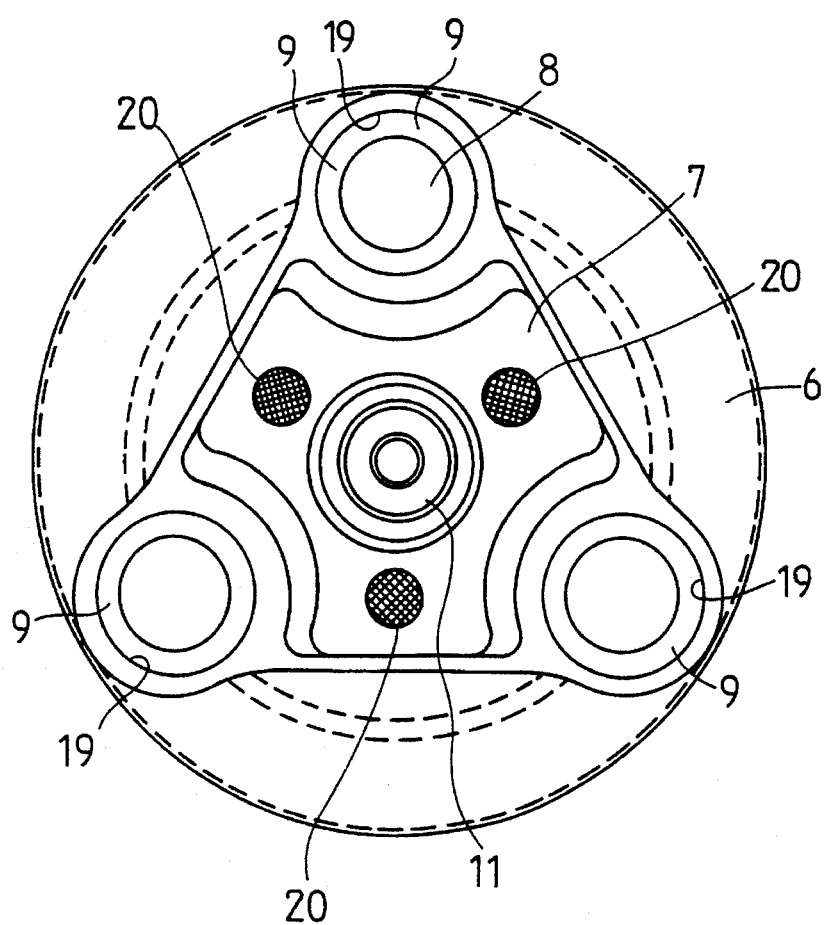
FIG. 4 is a side view seen from A in FIG. 2.
Figure 5:
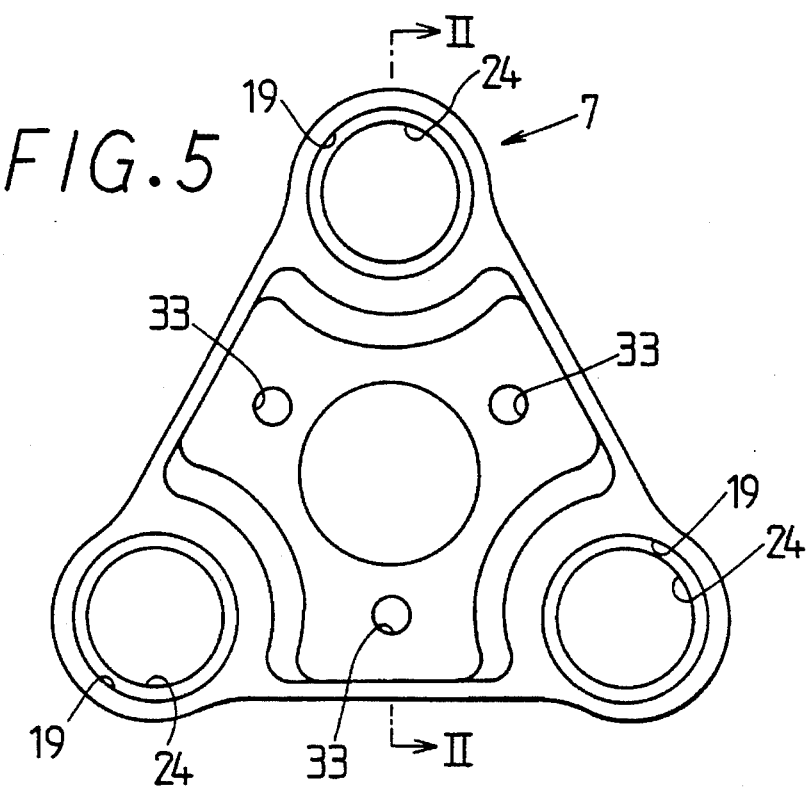
FIG. 5 is a detailed view of main portions of a plate 7.
Figure 6:
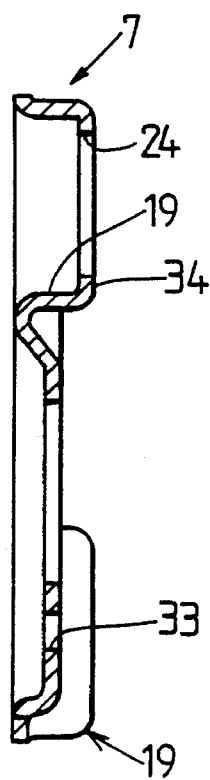
FIG. 6 is a sectional view taken along a line II—II in FIG. 5.

FIG. 2 shows a sectional view of the electromagnetic clutch 1; FIG. 3 illustrates a schematic view of the electromagnetic clutch mounted on a vehicle; FIG. 4 shows a hub member 5 seen from the direction shown by an arrow A in FIG. 2; FIG. 5 shows a detailed view of main portions of a single plate 7 and FIG. 6 illustrates a sectional view taken along a line II—II in FIG. 5.

Referring to FIG. 3, an electromagnetic clutch 1 is designed to receive the driving force from an engine 200 and to intermit (operate or stop) the operation of a refrigerant compressor 300 of an air conditioner for a vehicle.

This electromagnetic clutch 1 is, as shown in FIG. 2, composed of an electromagnetic coil 2, a stator housing 3, a rotor 4 and a hub-sub member 5 or the like.

The electromagnetic coil 2 is wound in the form of an annular ring on the outer periphery of a bobbin 10 made of a resin which is provided in the stator housing 3. This electromagnetic coil 2 is electrically connected to a battery (not shown). When an electric current is supplied to the electromagnetic coil 2, the electromagnetic coil generates a magnetomotive force. In other words, when the electric current is supplied to the electromagnetic coil 2, the electromagnetic coil 2 generates a magnetic flux in a magnetic circuit including the stator housing 3, the rotor 4 and an armature 6. As a result, the armature 6 is attracted by the rotor 4 against the resilient force of elastic members 9.

The stator housing 3 is formed with, for example, a magnetic material such as a low carbon steel which is defined S 10C in Japanese Industrial Standard (JIS) or the like in the shape of an annulus ring with a U-shape in section. The stator housing 3 holds the electromagnetic coil 2 therein. This stator housing 3 is fixed to the housing 12 of a refrigerant compressor 300 through an annular ring shaped attaching flange 11.

The rotor 4 is formed with, for example, a magnetic material such as a low carbon steel (S 10C in JIS) or the like and in the shape of an annular ring with a U-shape in section. This rotor 4 is rotatably fitted to the outer periphery side of the housing 12 of the refrigerant compressor 300 through a ball bearing 13.

A pulley 14 connected to the driving shaft 100 of the engine 200 through a belt (not shown) is joined to the outer periphery of the rotor 4 by a welding method or the like. Further, on the left-side surface of the rotor 4, as clearly illustrated in FIG. 2, an annulus ring shaped frictional surface 15 which is frictionally engaged with the armature 6 is formed.

Additionally stated, two rows of circular arc shaped gap 16 which are adapted to bypass the magnetic flux generated by the electromagnetic coil 2 are formed on the same circumferences. An annular ring shaped frictional material 17 is mounted in the frictional surface 15 side gap of the two rows of circular arc shaped gap 16 which is located in the outer periphery side so that the frictional force of the rotor 4 and the armature 9 can be improved. The hub sub-member 5 includes, as illustrated in FIGS. 2 and 4, the armature 6, a plate 7, first rivets 8, elastic members 9 and an inner hub 11.

The armature 6 is made of, for example, a magnetic material such as a low carbon steel (S 10C in JIS) and formed in the shape of an annulus ring plate. This armature 6 is so arranged to be opposed to the frictional surface 15 of the rotor with a narrow space provided therebetween. On the right-side surface of the armature 6 as illustrated in FIG. 2, is formed an annular ring shaped frictional surface 26 which is frictionally engaged with the frictional surface 15 the rotor 4.

Further stated, one row of circular-arc shaped gap 27 for bypassing the magnetic flux generated by the electromagnetic coil 2 is formed on the same circumference. In addition, on the armature 6, fitting holes 28 into which first rivets 8 are fitted are formed on the same circumference as that of the circular arc gap 27. The fitting holes 28 are formed at positions opposed to the insertion holes of a plate 7, which will be described hereafter.

The plate 7 is made of, for example, a low carbon steel (S 10 C) and formed in a substantially triangular shape, as apparently shown in FIG. 5. The plate 7 is provided on an end face 70 (refer to FIG. 2) in the non-attracting surface opposite to the frictional surface 26.

At three apex angular portions of this substantially triangular form of the plate 7, insertion portions 19 recessed in a cylindrical cup in the side of the refrigerant compressor are formed. In these insertion portions 19, elastic members 9, to be described hereafter, are provided. As can be seen in FIG. 6, an insertion hole 24 formed in a circular shape into which each of the first rivets 8 are freely fitted is formed at the central portion on the bottom of each of the insertion portion 19. The center of the insertion portion 19 is concentric with that of the insertion hole 24. The outside diameter of each of the insertion holes 24 is smaller than that of each insertion portion 19. Therefore, an annular protruding portion 34 which protrudes toward the inside diameter side of each of the insertion portions 19 is formed on the bottom portion of each insertion portion 19. Additionally stated, at the substantially central portions of the three sides of the triangular shape and on the circumference around the center of this triangular shape, fitting holes 33 are formed into which second rivets are fitted. The abovementioned insertion portions constitute elastic member housing portions, which will be more specifically described hereinbelow.

As apparent from FIG. 2, an inner hub 11 is arranged in the inner periphery side of the armature 6. The inner hub 11 is formed with, for example, a low carbon steel (S 10 C). The hub 11 consists of a flange portion 22 formed in an annular ring plate shape which is opposed to the plate 7 and a cylindrical portion 23 which extends from the side end portion in the inner periphery of this flange portion 22 to the driving shaft 100 of the refrigerant compressor. In the flange portion 22, fitting holes 32 into which second rivets 20 are fitted are formed. The second rivets 20 pass through the fitting holes 32 of the inner hub and the fitting holes 33 of the plate 7 so that the plate 7 is fixed to the inner hub 11.

The inserting portions 19, the first rivets 8 and the elastic members 9, which are main portions of the present invention will now be described in more detail.

Figure 1:
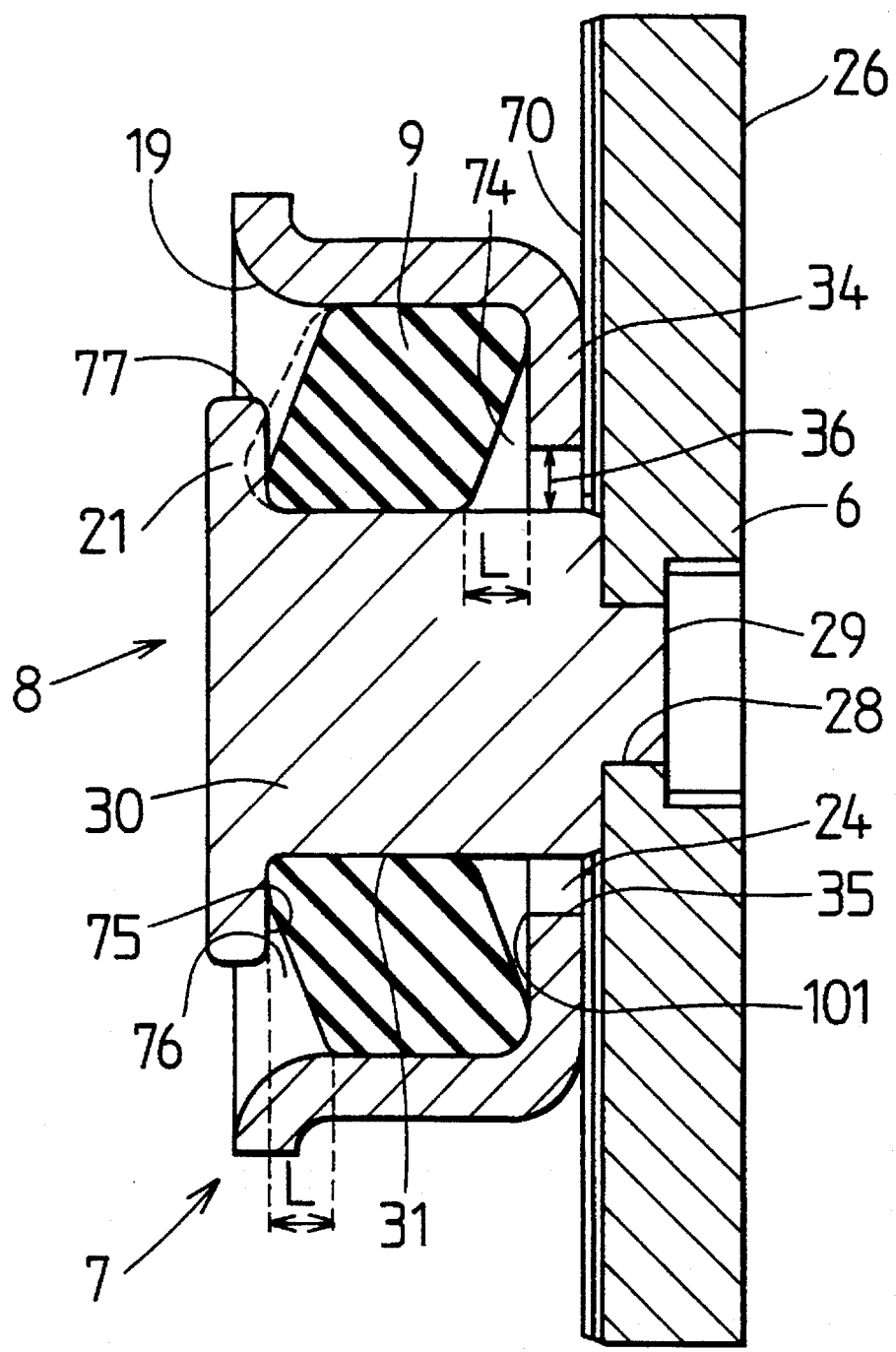
FIG. 1 is a detailed view of the main portions of an electromagnetic clutch according to a first embodiment of the present invention.

FIG. 1 illustrates a sectional view taken along a line I—I in FIG. 2.

Each of the first rivets includes, from the refrigerant compressor side (from the right side in this figure), a first cylindrical fitting portion 29 fitted into the fitting hole 28 of the armature, a second fitting portion 30 concentric with the center of the first fitting portion 29, and a flange portion 21 protruding perpendicularly to the end portion of the second fitting portion 30.

The height of this flange portion 21 in the protruding direction is set in such a manner that upon starting of the electromagnetic clutch 1 (when the frictional surface 15 of the rotor 4 is engaged with the frictional surface 26 of the armature 6), or upon steady operation upon the elapse of a prescribed time after the electromagnetic clutch continuously operates from starting, the bulge or deformation of each of the elastic members 9 due to torque exerted upon the elastic member 9 is suitably suppressed. Further, the first rivets 8 are so designed as to press the elastic members 9 toward the right in FIG. 1.

Then, each of the first fitting portions 29 of the first rivets 8 is concentrically inserted into each of the insertion holes 24 of the plate 7 through each of the elastic members 9, to be mentioned later. Thus, each end face (shown in the right side of FIG. 1) of the second fitting portions 30 is made to abut against the end face 70 of the armature 30, so that the armature 6 fixed to the plate 7. In this case, since the aperture diameter of each of the insertion holes 24 is larger than the outside diameter of each of the second fitting portion 30 of the first rivets 8, a first annular ring shaped gap 36 is formed by the inner peripheral surface 35 (the peripheral wall of the present invention) of each of the flange portions 34 of the plate 7 and the outer peripheral surface 31 of each of the second fitting portions 30. The first rivets 8 constitute fixing members in accordance with the present invention.

A way for setting the first gaps 36 will be specifically explained hereafter.

The elastic member 9 is formed in an annular ring shape with for example, chlorinated butyl rubber (CL-11R), which has excellent vibration absorption. The elastic member is provided with the functions as mentioned below. That is, they include a function of transmitting the rotating power of an internal combustion engine to a driving shaft (not shown) of the refrigerant compressor through the plate 7, an elastic function in a rotating direction to absorb torque fluctuation transferred to the plate 7 from the driving shaft of the refrigerant compressor, and a releasing function for releasing the armature from the rotor when the supply of electricity to the electromagnetic coil 2 is stopped etc.

As can be seen in FIG. 1, each of the elastic members is configured in an annular and substantially conical shape in section protruding toward the side opposite to the refrigerant compressor side (in the left side in FIG. 1). Each elastic member 9 is fitted under pressure into the inserting hoe 19 of the plate 7 so that the outer peripheral surface of the elastic member 9 comes into tight contact with the inner peripheral surface of the inserting portion 19. In the arrangement of the elastic member 9, the center of each of the elastic members 8 is passed through by each of the second fitting portions 30 of the first rivets 8 so that the inner peripheral surface of the elastic member 9 comes into tight contact with the outer peripheral surface 31 of the second fitting portion 30 of each of the first rivets 8.

As illustrated in FIG. 1, the length L of the inclined surface of the elastic member 9 in the direction of the driving shaft of the refrigerant compressor is set so in consideration of an attraction gap between the rotor 4 and the armature 6 and friction between the rotor and the armature and an abrasion between the frictional surface 15 of the rotor 4 and the frictional surface 26 of the armature 6.

Since each of the elastic members 9 is formed in a substantially conical shape, a third annular and conical gap 74 is formed between each of the elastic members 9 and the edge portion 101 of each of the insertion holes 24 facing the elastic members 9. In addition, a second gap 76 is formed between the end portion 77 of each flange portion 21 and each elastic member 9 facing this end flange portion 21. The elastic member 9 of the above-mentioned structure is expanded or bulges as indicated by dotted lines in FIG. 1, when torque (torsional force in a rotating direction) is applied to the first rivets 8 through the armature 6 upon starting of the electromagnetic clutch or steady operation of the electromagnetic clutch. However, since each of the elastic members 9 is pressed by each of the end faces 75 of the flange portions 21 in the direction of left side in FIG. 1, the deformation of the elastic member 9 can be desirably suppressed.

Then, even if each of the elastic members 9 is slightly deformed, the elastic member does not come into contact with the end portion 77 of the flange portion 21 by virtue of the second gap 76, and breakage of or cracks in the elastic member 9 is not generated. Therefore, the durability of the elastic members 9 can be improved. At the time of starting of the electromagnetic clutch 1, each of the first rivets 8 is pulled toward the right side in FIG. 1, so that the flange portion 21 of each of the first rivets 8 presses each of the elastic members 9 in the direction of the right side in FIG. 1. However, the elastic members 9 do not collide with each of the edge portions 101 of the insertion holes 24. Consequently, the respective elastic members are not broken by the edge portions 101 of the insertion holes 24. Thus, the durability of the elastic members can be further improved, and therefore, the durability of the electromagnetic clutch can also be improved.

Next, a way for setting the above stated first gaps 36 will be described in more detail.

Figure 7:
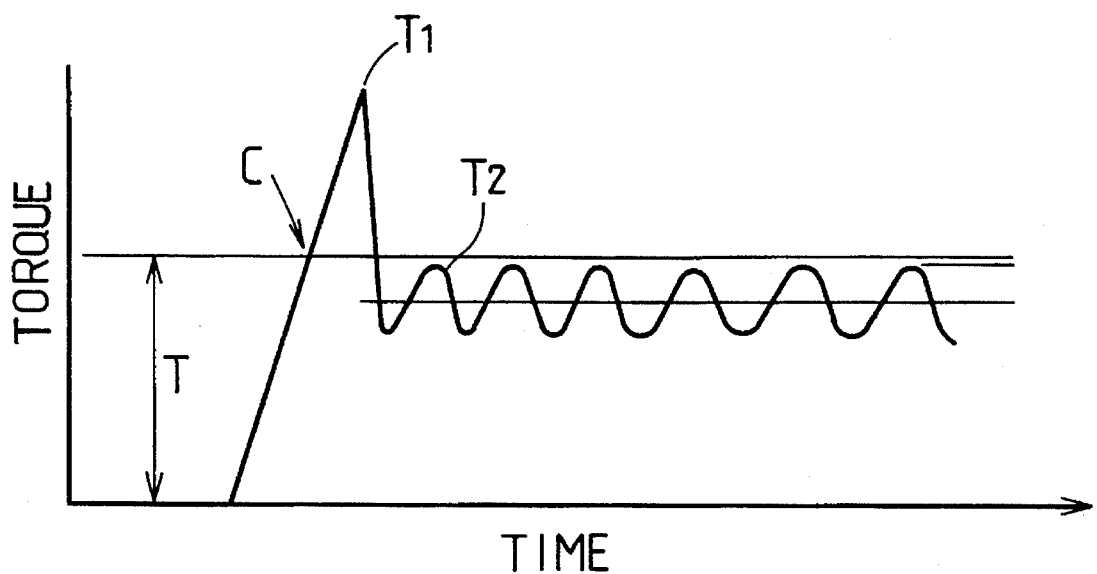
FIG. 7 is a view showing torque exerted on the elastic members upon starting and during steady operation of the electromagnetic clutch.
Figure 8:
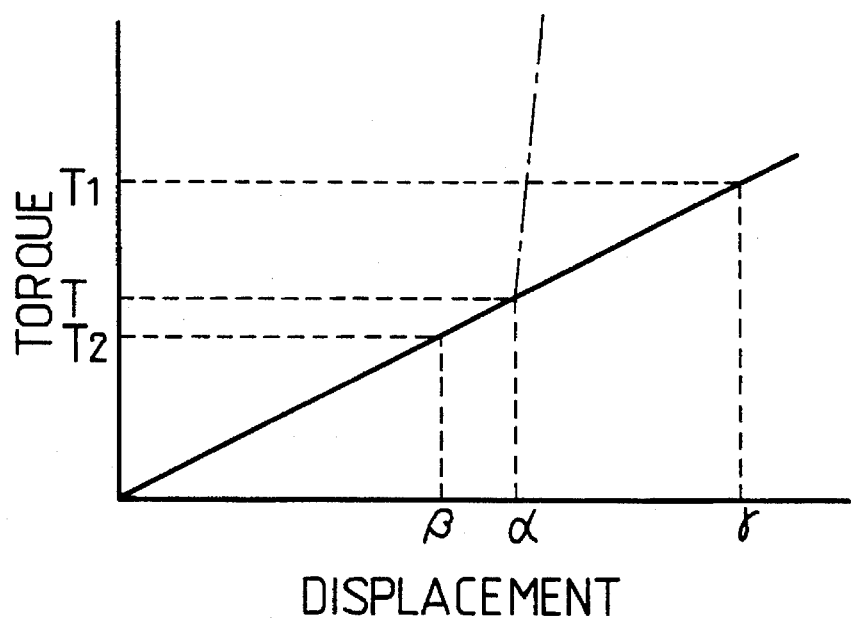
FIG. 8 is a view illustrating the relationship between the torque applied to the elastic members and deformation and displacement of the elastic member.

With reference to FIG. 7, a torque (torsional force acting in a rotating direction as heretofore mentioned) exerted upon the elastic members 9 upon starting of the electromagnetic clutch 1 is illustrated. In FIG. 8, elastic characteristics of the elastic member 9 are shown.

As can be seen in FIG. 7, the torque exerted upon the respective elastic members 9 reaches a peak torque T1 (first maximum torque) immediately after the electromagnetic clutch 1 is activated. During steady operation of the electromagnetic clutch after the lapse of a predetermined time, the above described torque changes in the form of corrugation with torques T2 as maxima (second maximum torque) due to the torque variation amplitude of torque of the refrigerant compressor. As pointed out in this case, the lapse of a predetermined time means time passing after the activation of the electromagnetic clutch until the torque changes to the corrugated form of torque whose peaks are torque T2.

The relationship between the torque applied to the elastic members 9 and the displacement thereof is illustrated, for example, by a solid line in FIG. 8. It is assumed that when the torque applied to the elastic members 9 is T1 and T2, the deformation and displacement of the elastic members is respectively γ, β. Further, it is assumed that the deformation and displacement α which is a little larger than β and smaller than γ is the width of each of the first gaps 36 (vertical width in FIG. 1), and that the torque at that time is torque T.

When each of the gaps 36 is set in the above-mentioned manner, the torque applied to the elastic member 9 becomes larger than the torque T. Briefly stated, as illustrated at point C in FIG. 7, when the electromagnetic clutch 1 is started and torque T is exerted on each of the elastic members 9, the elastic member 9 is compressed by the amount of displacement α, then, the inner peripheral surface 35 of the flange portion 34 abuts against the outer peripheral surface 31 of the second fitting portion 30. As a result, in a case where a torque larger than the torque with value T acts on each of the elastic members 9 (for example, torque T1), the elastic member 9 is not displaced by α or more. Therefore, deformation of the elastic members can be controlled, as indicated by the dotted dash line in FIG. 8.

The reason why torque T is set so as to be slightly larger than torque T2 is that when, for example, torque T is so set as to be smaller than torque T2, the inner peripheral surface 35 of each flange portion 34 readily abuts against the outer peripheral surface 34 of each second fitting portion 31, so that the resilient force of the elastic member cannot be effectively employed. Since the torque T is set to be slightly larger than the torque T2, impact transferred from the rotor to the armature can be reduced.

Accordingly, the durability of the elastic members 9 can be further improved and the durability of the electromagnetic clutch can be also enhanced.

Although a preferred embodiment of the present invention has been disclosed hereinabove, it is contemplated that the present invention will be applicable to various modifications, described hereafter.

Figure 9:
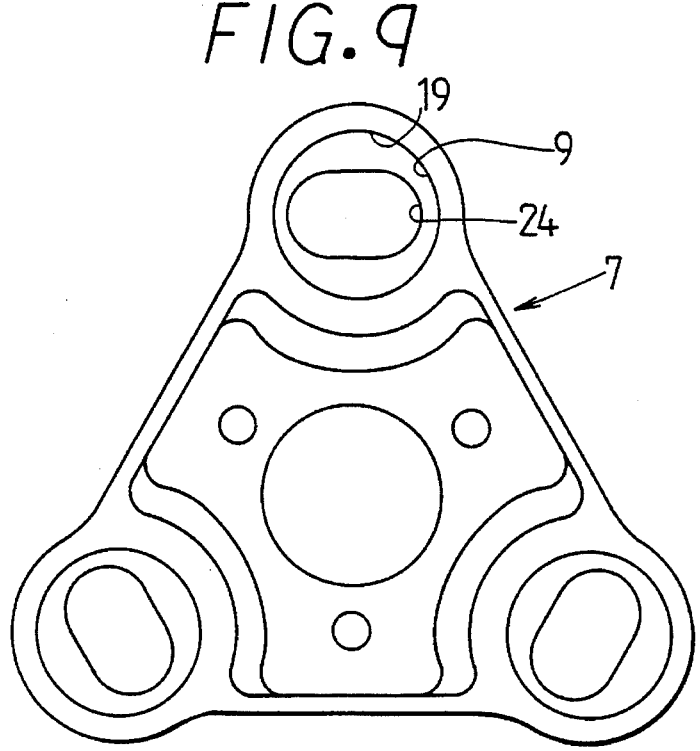
FIG. 9 shows another forms of insertion holes 24 of the plate 7.

Although, in the above-mentioned embodiment, each of the insertion holes is formed in a circular shape, it will be understood that the insertion holes may be formed in the shape of a slot, as illustrated in FIG. 9. In other words, it is to be noted that if the first gap 36 between the outer peripheral surface 31 of the second fitting portion 30 in the rotating direction and the inner peripheral surface 35 of the flange portion 34 is set as previously pointed out, various configurations may be adopted for the insertion holes 24.

Figure 10:
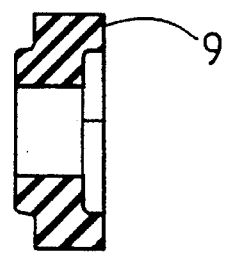
FIG. 10 shows another forms of the elastic member 9.

Further, while in the above-described embodiment the elastic member 9 is formed in a conical shape, it will be understood that a step portion may be provided in the elastic member 9, as shown in FIG. 10. That is, when torque is exerted on the elastic member 9 at the time of starting or operating of the electromagnetic clutch 1, it is desired that each elastic member does not abut against the end portion 77 of the flange portion 21 and the edge portion 101 of the insertion hole 24.

Figure 11:
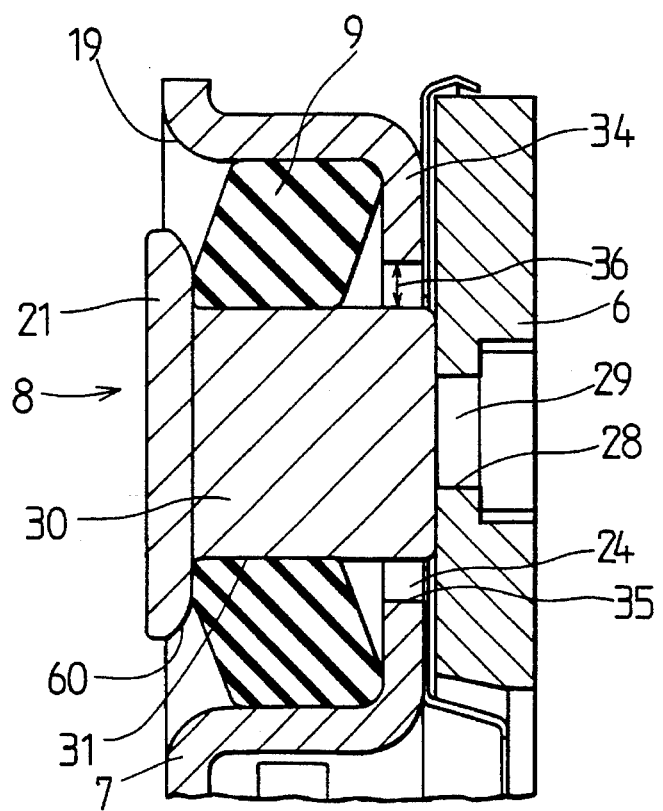
FIG. 11 is a partially enlarged view illustrating modified rivet.
Figure 12:
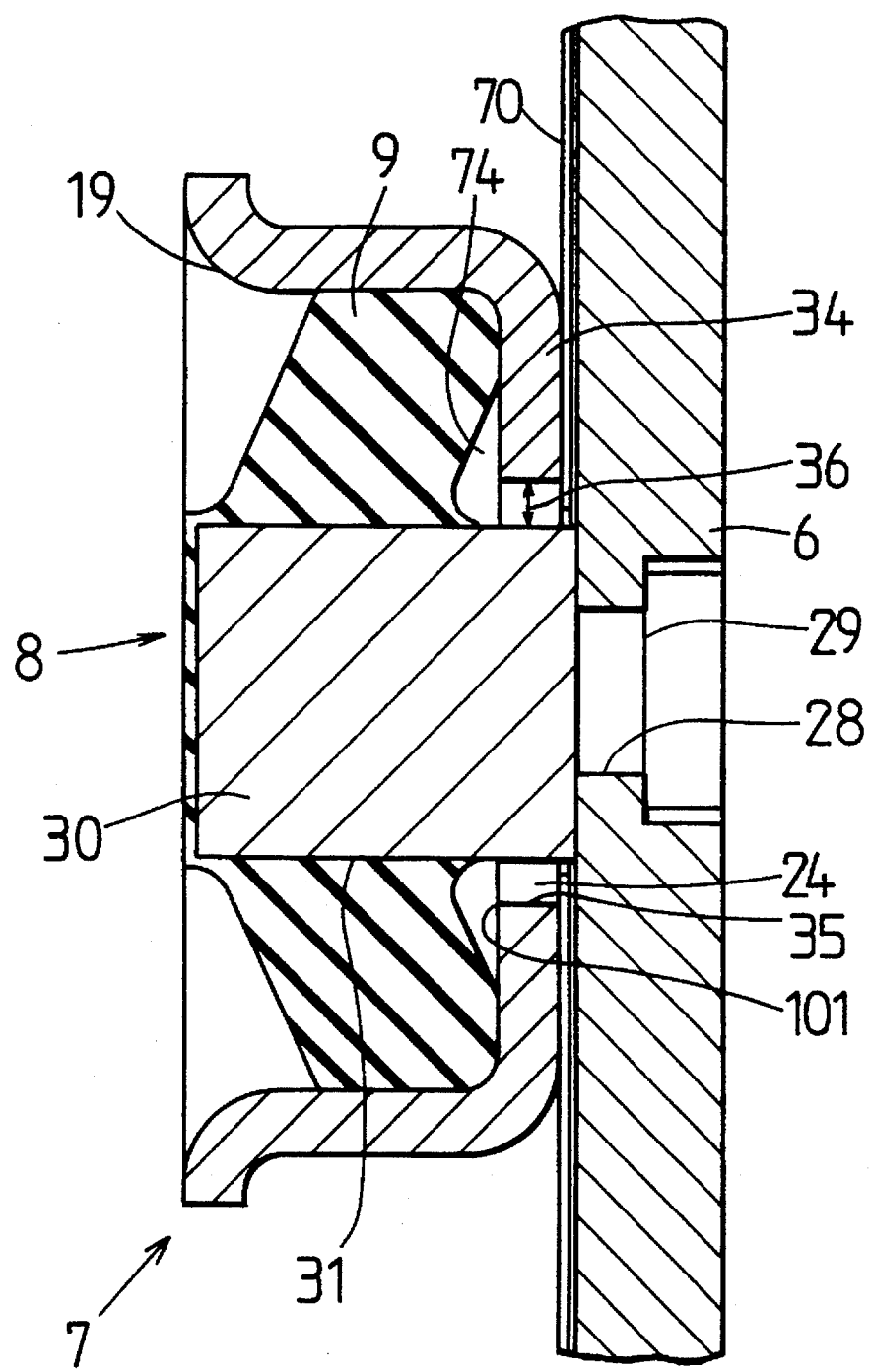
FIG. 12 is a partially enlarged view illustrating modified rivet.

Alternatively, as shown in FIG. 11, each elastic member 9 preferably does not abut against the end portion of the flange portion 21 when impact is applied to the elastic member upon starting and operating of the electromagnetic clutch 1, due to provision of an inclined surface 60 (curved surface) in the direction of outside diameter and the side opposite to the refrigerant compressor in the side surface of the refrigerant compressor of the first flange portion 21.

As heretofore mentioned above, when at least one method which includes the setting of the first gaps 36, the formation of the second gaps 76, and the formation of the third gaps 74 is carried out, the durability of the elastic members 9 can be improved. As a result, the durability of the electromagnetic clutch can be also improved.

Although, in the above stated embodiment, each first rivet 8 passes through the center of the elastic member 9 so that the inner peripheral surface of the elastic member 9 comes into tight contact with the outer peripheral surface 31 of the first rivet 8, the inner peripheral surface 13 of the elastic member 9 may be preferably bonded to the outer peripheral surface 31 of the first rivet 8. In this case, as illustrated in FIG. 13, the flange portion is not needed. Namely, since the elastic member 9 is not moved toward the direction of left in FIG. 13 because of bonding, it is not necessary to press each elastic member 9 by the flange portion 21. In this case, there is no fear that the durability of the elastic member deteriorates by virtue of the presence of the flange portion 21. Thus, the third gaps 74 may be suitably formed.

Although, in the present embodiment, it has been described that the outer peripheral surface and the inner peripheral surface of the insertion portion 19 and the elastic member 9, and the outer peripheral surface 31 of the first rivet 8 are formed in a circular shape, it is to be understood they may not be circular in configuration, and may be formed in, for example, an elliptical shape, an oval shape or a rectangular shape.

Further, although in the above described embodiment the present invention has been applied to an electromagnetic clutch for the air conditioner, it will be appreciated that the invention may be applied to an electromagnetic clutch mounted on business equipment (copying machines) or the like.

Therefore, it is intended that the present invention not be limited to a power transmitting device which is engaged (attracted) or disengaged (released) by magnetic force and may be applicable to any kind of power transmitting device without departing from the true spirit and scope of the invention.

What is claimed is:

1. A power transmitting device for intermittently transmitting power to a rotating machine, comprising:

a first rotating member which receives power from a driving force source to rotate;

a first rotated member having an engaging surface facing one end face of said first rotating member and selectively engaging therewith or disengaging therefrom;

a second rotated member fixed to a non-engaging surface side of said first rotated member, for transmitting power to a drive shaft of a rotating machine;

a cylindrically recessed elastic member housing portion provided in said second rotated member and having an insertion hole in a bottom portion thereof;

an elastic member provided in said elastic member housing portion and contacting to an inner peripheral wall of said elastic member housing portion; and a fixing member tightly inserted in said elastic member in a direction of the drive shaft and penetrating said insertion hole to fix said first rotated member and said second rotated member together, a first gap being formed between an outer peripheral wall of said fixing member and a peripheral wall of said insertion hole in a rotating direction of the drive shaft of the rotating machine, wherein said first gap is set smaller than a first deformation and displacement of said elastic member which is generated based on a first maximum torque exerted on said elastic member immediately after one end face of said first rotating member has engaged with said engaging surface of said first rotated member, and larger than a second deformation and displacement which is generated based on a second maximum torque upon steady operation after a lapse of predetermined time after the one end face of said first rotating member engages with said engaging surface of said first rotated member.

2. A power transmitting device according to claim 1, wherein said fixing member has a flange portion for pressing said elastic member to said first rotated member at one end of said fixing member, said flange portion has a second gap provided between an end portion thereof and said elastic member facing the end portion.

3. A power transmitting device according to claim 2, wherein said elastic member has a third gap provided between an edge portion of said insertion hole and said elastic member facing the edge portion.

4. A power transmitting device according to claim 3, wherein a cross-section of said third gap has an approximately triangle shape with sides of said fixing member, said elastic member housing and said elastic member.

5. A power transmitting device according to claim 2, wherein a cross-section of said second gap has an approximately triangle shape with sides of said flange portion, an insert portion of said plate and said elastic member.

6. A power transmitting device according to claim 1, wherein said elastic member has a third gap provided between an edge portion of said insertion hole and said elastic member facing the edge portion.

7. A power transmitting device according to claim 6, wherein a cross-section of said third gap has an approximately triangle shape with sides of said fixing member, said elastic member housing and said elastic member.

8. A power transmitting device according to claim 6, wherein said first gap is set nearer to a second displacement side than to an intermediate displacement, within a range from said second deformation and displacement to said first deformation and displacement.

9. A power transmitting device for intermittently transmitting power to a rotating machine, comprising:

a first rotating member which receives power from a driving force source to rotate;

a first rotated member having an engaging surface facing one end face of said first rotating member and selectively engaging therewith or disengaging therefrom;

a second rotated member fixed to a non-engaging surface side of said first rotated member, for transmitting power to a drive shaft of a rotating machine;

a cylindrically recessed elastic member housing portion provided in said second rotated member and having an insertion hole in a bottom portion thereof;

an elastic member provided in said elastic member housing portion and contacting to an inner peripheral wall of said elastic member housing portion; and a fixing member tightly inserted in said elastic member in a direction of the drive shaft and penetrating said insertion hole to fix said first rotated member and said second rotated member together, a first gap being formed between an outer peripheral wall of said fixing member and a peripheral wall of said insertion hole in a rotating direction of the drive shaft of the rotating machine, wherein said elastic member has a second gap provided between an edge portion of said insertion hole and said elastic member facing said edge portion.

10. A power transmitting device according to claim 9, wherein said fixing member has a flange portion for pressing said elastic member to said first rotated member at one end of said fixing member, said flange portion has a third gap provided between an end portion thereof and said elastic member facing said end portion.

11. A power transmitting device for intermittently transmitting power to a rotating machine, comprising:

a first rotating member which receives power from a driving force source to rotate;

a first rotated member having an engaging surface facing one end face of said first rotating member and selectively engaging therewith or disengaging therefrom;

a second rotated member fixed to a non-engaging surface side of said first rotated member, for transmitting power to a drive shaft of a rotating machine;

a cylindrically recessed elastic member housing portion provided in said second rotated member and having an insertion hole in a bottom portion thereof;

an elastic member provided in said elastic member housing portion and contacting to an inner peripheral wall of said elastic member housing portion; and a fixing member tightly inserted in said elastic member in a direction of the drive shaft and penetrating said insertion hole to fix said first rotated member and said second rotated member together; and a flange portion pressing said elastic member to said first rotated member and provided at one end of said fixing member, said flange portion having a first gap provided between an end portion of said flange portion and said elastic member facing said edge portion.

12. A power transmitting device for intermittently transmitting power from a rotating machine, comprising, in combination:

a rotating machine having a shaft;

a first rotating member which receives power from a driving force source to rotate;

a first rotated member having an engaging surface facing one end face of said first rotating member and selectively engaging therewith or disengaging therefrom;

a second rotated member fixed to a non-engaging surface side of said first rotated member and connected to the drive shaft of said rotating machine for transmitting power to said drive shaft;

a cylindrically recessed elastic member housing portion provided in said second rotated member and having an insertion hole in a bottom portion thereof;

an elastic member provided in said elastic member housing portion and contacting an inner peripheral wall of said elastic member housing portion; and a fixing member tightly inserted in said elastic member in a direction of said drive shaft and penetrating said insertion hole to fix said first rotated member and said second rotated member together, first gap being formed between an outer peripheral wall of said fixing member and a peripheral wall of said insertion hole in a rotating direction of said drive shaft of said rotating machine, wherein said first gap is set smaller than a first deformation and displacement of said elastic member which is generated based on a first maximum torque exerted on said elastic member immediately after one end face of said first rotating member has engaged with said engaging surface of said first rotated member, and larger than a second deformation and displacement which is generated based on a second maximum torque upon steady operation after a lapse of predetermined time after the one end face of said first rotating member engages with said engaging surface of said first rotated member.

* * * * *